United States Patent Office 2,712,166
Patented July 5, 1955

2,712,166

METHOD OF MAKING BRONZE BACKED, CAST BABBITT LINED BEARINGS

James B. Mohler, New Castle, Pa., assignor to Johnson Bronze Company, New Castle, Pa., a corporation of Pennsylvania No Drawing. Application April 12, 1954, Serial No. 422,663

6 Claims. (Cl. 22—204)

This invention relates to a method of making composite bearings comprising a bronze backing and a cast babbitt lining with improved bond life.

There are many bronze backed, cast babbitt lined bearings in service today with unsatisfactory bearing life. Complaints are numerous that the bond between the cast babbitt metal lining and the bronze backing is unsatisfactory.

Bronze backed, cast babbitt lined, railroad journal bearings are now manufactured by the following method. The bronze backing usually contains:

Copper _____ 73%.
Tin _____ 5 to 7%.
Lead _____ 14 to 22%.
Zinc _____ 3% max.

The inside of a cast bronze backing is machined to proper size, the backing is painted with an inorganic stop-off material to prevent tinning of this area, the machined surface is wiped with zinc chloride flux, and the bronze backing is allowed to float on a lead-tin bath containing 70% lead and 30% tin until the backing is "tinned" and preheated. The temperature of the preheat "tinning" alloy may be 650° F. and the backing may be subjected to the preheat tinning alloy for say 1–10 minutes. The backing having a coating of the preheat tinning alloy thereon is removed from the tinning bath and is clamped in a rack. Molten Babbitt metal at a temperature of say 740° F. is then cast against the coated backing and immediately thereafter water is sprayed against the back of the backing to cool it quickly. The bearing is then removed from the rack and machined to desired dimensions. The babbitt lining may be of the composition:

Tin _____ 3 to 5%.
Antimony _____ 8 to 10%.
Copper _____ 0.50% max.
Lead _____ Remainder.

This method requires accurate control of the various steps in order to produce a satisfactory bond between the Babbitt metal lining and the bronze backing. Successful bonding depends upon the temperature of the preheat tinning alloy, the time the backing is in the preheat tinning alloy, the temperature of the backing when the molten Babbitt metal lining is poured onto the backing, the temperature of the Babbitt metal when it is poured onto the backing and the time interval between casting and spraying the backing with water. Although there is some latitude in the time and temperatures employed in the various steps, they must be controlled within rather accurate limits in order to obtain satisfactory bonding of the Babbitt metal lining to the bronze backing. If the temperatures are too low or the heating times too short, satisfactory bond will not be obtained whereas if the temperatures are too high or the heating times are too long, the bond between the tin-containing Babbitt metal and the bronze backing will deteriorate. This bond deterioration may occur in making the bearing or in the use of the bearing. It will be understood that in using the bearing, it may reach a temperature of 200, 300, 400 degrees F. or higher and at these temperatures bond deterioration may occur. Furthermore, the bearing sometimes is annealed in order to reduce the brittleness of the Babbitt metal lining so as to prevent cracking thereof during machining. This also tends to cause the bond to deteriorate.

The following data illustrate the effect produced on the bond by heating bronze backed, cast babbitt lined bearings at 300° F. for the time indicated. In making the bearings, the temperature of the preheat "tinning" alloy bath was 650° F. and the temperature of the Babbitt metal was 750° F. when cast onto the bronze backing. The bronze compositions employed were:

| Bronze | Cu | Sn | Pb | Zn |
|---|---|---|---|---|
| A | 80 | 10 | 10 | |
| B | 84 | 5 | 9 | 2 |

The babbitt compositions employed were:

| Babbitt Number | Pb | Sn | Cu | Sb | Ag |
|---|---|---|---|---|---|
| 1 | Bal. | 3 | | 10 | 2.6 |
| 2 | .35 | Bal. | 5.7 | 6.7 | |
| 3 | Bal. | 5 | 0.5 | 10 | |

The following Table 1 shows the bearing number, the composition of the bronze backing, the composition of the babbitt lining and the type of bond between the babbitt lining and the bronze backing after heating at 300° F. for the time indicated. The bond was determined by chisel test and in Table 1 the letter G designates "good," the letter F "fair" and the letter B "bad."

Table 1

| Bearing Number | Backing Bronze | Lining Babbitt | Hours at 300° F.—Chisel Test | | | | | | | |
|---|---|---|---|---|---|---|---|---|---|---|
| | | | 0 | 1 | 2 | 4 | 7 | 16 | 48 | 52 | 66 |
| 1 | A | 2 | F | | F | B | | | | | |
| 2 | A | 3 | G | G | G | B | | | | | |
| 3 | A | 1 | G | G | F | B | | | | | |
| 4 | B | 3 | G | | | G | G | G | G | F | B |
| 5 | B | 1 | G | G | G | G | F | B | | | |

It was found that tin base babbitt such as babbitt No. 2 almost invariably had a brittle bond on casting that could not be improved by annealing and that deteriorated on heating. This is thought to be due to structural changes in the babbitt rather than due to bond deterioration.

From Table 1 it can be seen that in the case of the lead base babbitts, even though the bond is good in the as-cast condition of the bearing, the bond life is short when the bearing is heated. The bonds in bearing Nos. 2 and 3 deteriorated at 4 hours' heating; that of bearing No. 5 at 16 hours' heating and that of bearing No. 4 at 66 hours' heating, all at a temperature of 300° F. Other tests of bearings heated to lower temperatures showed longer bond life but even at temperatures below 200° F. the bond life was only a few hundred hours whereas for satisfactory bond life a bearing in many instances is required to run many hundreds of hours at these temperatures. As previously stated, bond deterioration may be caused by the heat developed in making the bearing, by that used in annealing it or by that developed in use of the bearing or by a combination of all of these factors.

I have found that in bearings made in accordance with the method described by casting molten tin-containing lead base Babbitt metal onto a bronze backing, deterioration of the bond between the tin-containing Babbitt metal lining and the bronze backing by heat can be inhibited or overcome by the use of an electrodeposited barrier layer of metal such as nickel, cobalt, or iron between the bronze backing and the cast tin-containing babbitt. I can use as the barrier layer any metal or alloy that will prevent or greatly inhibit diffusion of tin from the Babbitt metal lining into the bronze backing, that can be bonded to the bronze backing and on which the tin-containing, lead base babbitt can be bonded by casting. By employing the layer of barrier metal, casting of the tin-containing Babbitt alloy can be done at higher temperatures to assure that bonding will take place by exceeding the minimum thermal conditions usually required, without causing bond deterioration.

I have found that a very thin layer of nickel will cause the bond life of a cast lead base babbitt on bronze bearing to be sufficiently long that the bearing will not fail due to this cause. A nickel barrier layer 0.1 mil thick and even less will increase the bond life beyond 2000 hours when heated at 300° F. or beyond 400 hours when heated at 400° F. Tests for longer times at these temperatures were carried out and it was found by chisel tests that the bond was still good but these times and temperatures are considered sufficiently long to show that the bond life is longer than the normal bearing life.

A nickel barrier layer 0.025 mil thick showed bond deterioration of lead base cast babbitt on bronze after 100 hours at 400° F. For thicknesses of 0.05 to 1.0 mil, the bond was good after heating for 400 hours at 400° F. A thickness of 0.1 to 0.2 mil is considered to be practical, although thicker or thinner nickel barrier layers may be used.

The nickel plating may be accomplished in a known manner. As illustrative of a satisfactory method, the bronze backing is degreased with trichlorethylene, subjected to anodic electrolytic cleaning in a solution of sodium hydroxide, sodium cyanide and Rochelle salts, pickled in a solution of hydrochloric and tartaric acid and nickel plated in a bath containing:

| | |
|---|---|
| Nickel sulfate | g./l.. 275 |
| Nickel chloride | g./l.. 50 |
| Boric acid | g./l.. 40 |
| pH | 3 |

Of course, the nickel plating process involves suitable rinsing steps.

In accordance with another embodiment of my invention, bronze backed, cast babbitt lined bearings may be manufactured in a variety of shapes and sizes, employing various bronze and babbitt compositions, by a centrifugal casting method as follows, compositions A and B being typical examples of bronzes and compositions 1 and 3 being typical examples of lead base, tin-containing babbitts.

The rough bronze casting is machined on the inside, outside and ends to produce a cylindrical shape. The inside of the cylinder is electroplated with a barrier layer of nickel, cobalt or iron, preferably nickel, the barrier layer being between 0.05 and 1.0 mil thick, preferably between 0.1 and 0.2 mil thick. The outside of the backing may be coated with an inorganic stop-off to prevent tinning in selected areas. The bronze backing is dipped in or wiped with zinc chloride solution for fluxing purposes and then immersed in a molten tinning bath to preheat the backing and apply a coating of tinning metal to the inside of the cylindrical backing. The tinning metal may be a lead-tin alloy, for example, an alloy containing 70% lead and 30% tin but usually it is pure tin. The molten tinning bath is heated to a temperature of 500 to 800° F., the preferred temperature being about 650° F. The backing is removed from the tinning bath, is placed in a centrifugal casting machine and molten Babbitt metal is poured into the backing while the machine is spinning. A few seconds after the babbitt is poured into the backing, the outside of the backing is sprayed with water and after stopping the spinning, the bearing is removed from the spinning machine and the babbitt lining is machined into cylindrical bearings or the cylinders may be split to produce half-cylindrical bearings. Also, the bearings may be produced with flanges or in other special shapes that can be made from a cylindrical, or modified cylindrical, casting. The temperature of the molten Babbitt metal at the time of casting may be from 500 to 1200° F., usually between 600 and 1000° F., the preferred range of temperature being between 650 and 800° F. The temperature range of the tinning bath and the molten babbitt may vary considerably depending upon the size of the backing. If the backing has a high heat content due to its mass, the backing may be tinned in a tinning bath at low temperature and/or the babbitt may be cast at a low temperature. On the other hand, if the backing has a thin wall and low heat content, it may be necessary to tin in a tinning bath at high temperature and/or to cast the babbitt at a high temperature to insure that the babbitt will be molten for a sufficient time after pouring it onto the backing to conform to the desired shape during spinning and for a sufficient time to create a bond. The backing is usually held in the preheating and tinning bath for 15 to 60 seconds. After casting the Babbitt metal in the backing, the backing is usually allowed to spin for 2 to 10 seconds before quenching and the quench is usually applied for 15 seconds to 2 minutes, although this usually is not timed but is stopped when steam no longer rises from the backing.

Another method by which bearing shells may be made according to my invention is by static casting the Babbitt metal between a cylindrical bronze shell and a removable carbon core. Shells were cast by this method on nickel plated bronze using bronze composition B and babbitt composition 3 as follows.

The bronze casting was bored on the inside and anodically etched for 1 minute at 6 volts in the following aqueous solution:

| | G./l. |
|---|---|
| Sodium cyanide | 40 |
| Sodium hydroxide | 40 |
| Rochelle salts | 20 |

The shell was rinsed and then dipped in an aqueous solution consisting of:

| | Per cent by weight |
|---|---|
| Hydrogen chloride | 14 |
| Tartaric acid | 5 |

The shell was rinsed and immersed in a Watts type nickel plating bath and plated for 1 hour and 20 minutes at a current density of 15 amperes per square foot. Molten Babbitt metal was cast statically into the shell using a carbon core and the shell was allowed to cool naturally. Measurement of a cross section under a microscope showed the nickel thickness to be 0.8 mil. After machining away a part of the babbitt lining, the shells were heated to determine the hot bond life. Some of the shells showed good bond life by chisel test after heating for 2000 hours at 300° F. Other shells showed good bond life after heating for 1150 hours at 400° F. These values are far in excess of what would normally be required of an engine bearing under operating conditions in an engine.

The invention is not limited to the preferred embodiment but may be otherwise embodied or practiced within the scope of the following claims.

I claim:

1. The method of making bronze backed, cast babbitt lined bearings, which comprises electrodepositing a thin barrier layer of metal of the group consisting of nickel, cobalt and iron on a bronze backing, and casting molten lead base, tin-containing Babbitt metal on said barrier layer to form a bearing lining.

2. A method according to claim 1, wherein the barrier layer is 0.05 to 1.0 mil thick.

3. The method of making bronze backed, cast babbitt lined bearings, which comprises electrodepositing a thin barrier layer of metal of the group consisting of nickel, cobalt and iron on a bronze backing, preheating the backing coated with barrier metal in a molten tinning bath, removing the backing coated with tinning metal from the tinning bath and casting molten lead base, tin-containing Babbitt metal on said coating of tinning metal to form a bearing lining.

4. The method of making bronze backed, cast babbitt lined bearings, which comprises electrodepositing a barrier layer of metal of the group consisting of nickel, cobalt and iron having a thickness of 0.05 to 1.0 mil on a bronze backing, preheating the coated backing in a molten tinning bath having a temperature between 500 and 800° F., removing the backing coated with tinning metal from the tinning bath and casting molten lead base, tin-containing Babbitt metal having a temperature between 500 and 1200° F. on said coating of tinning metal to form a bearing lining.

5. A method according to claim 4, wherein the molten lead base, tin-containing Babbitt metal is at a temperature between 600 and 1000° F. when cast on said coating of tinning metal on said backing.

6. A method according to claim 4, wherein the molten lead base, tin-containing Babbitt metal is at a temperature between 650 and 800° F. when cast on said coating of tinning metal on said backing.

No references cited.